(12) United States Patent
Evans

(10) Patent No.: US 10,947,851 B2
(45) Date of Patent: Mar. 16, 2021

(54) LOCAL PRESSURE SIDE BLADE TIP LEAN

(71) Applicant: United Technologies Corporation, Farmington, CT (US)

(72) Inventor: Simon W. Evans, Farmington, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 125 days.

(21) Appl. No.: 16/225,995

(22) Filed: Dec. 19, 2018

(65) Prior Publication Data
US 2020/0200014 A1 Jun. 25, 2020

(51) Int. Cl.
F01D 5/14 (2006.01)
F01D 5/20 (2006.01)

(52) U.S. Cl.
CPC ............ F01D 5/142 (2013.01); F01D 5/147 (2013.01); F01D 5/20 (2013.01); F05D 2220/32 (2013.01); F05D 2240/301 (2013.01); F05D 2240/305 (2013.01); F05D 2240/306 (2013.01); F05D 2240/307 (2013.01)

(58) Field of Classification Search
None
See application file for complete search history.

(56) References Cited

U.S. PATENT DOCUMENTS

| 1,828,409 | A | * | 10/1931 | Densmore | F01D 5/20 415/141 |
| 2,714,499 | A | | 8/1955 | Warner | |
| 5,525,038 | A | * | 6/1996 | Sharma | F01D 5/141 416/238 |
| 7,789,631 | B2 | | 9/2010 | Hoeger | |
| 9,845,683 | B2 | * | 12/2017 | Lamb, Jr. | F01D 5/14 |
| 9,856,739 | B2 | * | 1/2018 | Bedrosyan | F01D 5/20 |
| 10,753,215 | B2 | * | 8/2020 | Coudert | F01D 5/20 |
| 10,801,516 | B2 | * | 10/2020 | Montes Parra | F04D 29/384 |
| 2008/0213098 | A1 | | 9/2008 | Neef et al. | |
| 2014/0234112 | A1 | * | 8/2014 | Read | B64C 27/463 416/223 R |

(Continued)

FOREIGN PATENT DOCUMENTS

DE 560589 C 10/1932
EP 2820279 A2 1/2015

(Continued)

OTHER PUBLICATIONS

European Search Report for European Application No. 19215014.2, dated May 14, 2020, 7 pages.

Primary Examiner — Justin D Seabe
Assistant Examiner — Jason G Davis
(74) Attorney, Agent, or Firm — Cantor Colburn LLP

(57) ABSTRACT

A rotor blade of a gas turbine engine includes a pressure side, and a suction side opposite the pressure side and defining a rotor blade profile therebetween, the pressure side and the suction side each extending from a blade root to a blade tip. The rotor blade defines a cross-sectional median line midway between the pressure side and the suction side. The cross-sectional median line extends in a generally radial direction from the blade root to a lean point between the blade root and the blade tip. The cross-sectional median line extends off of radial from the lean point to the blade tip, defining a lean of the rotor blade between the lean point and the blade tip.

16 Claims, 3 Drawing Sheets

(56) References Cited

U.S. PATENT DOCUMENTS

2016/0230561 A1   8/2016  Duong et al.
2018/0298912 A1*  10/2018 Hall ..................... F04D 29/324

FOREIGN PATENT DOCUMENTS

GB       1231424   A     5/1971
WO       2014009959 A2   1/2014
WO    WO-2014109959 A1 *  7/2014  ............... F01D 5/20

* cited by examiner

LOCAL PRESSURE SIDE BLADE TIP LEAN

BACKGROUND

Exemplary embodiments of the present disclosure pertain to the art of gas turbine engines, and in particular to rotor blades of a gas turbine engine.

In gas turbine engine design, there is a trend toward smaller diameter core sections of the engine, in order to provide increased overall pressure ratio and increased bypass ratio without increasing overall engine diameter, including both the core and bypass flowpath. In an all-axial configuration, the high-pressure compressor of the small diameter core is limited in its performance by large tip clearance to rotor blade span ratio, and by large tip clearance to rotor blade chord ratios. These relative clearance sizes are larger than in larger diameter core compressors, due to the larger blade spans of such compressors. In the smaller diameter compressor, these larger ratios cause both reduced efficiency and reduced stall margin. To realize the cycle benefits of the increased overall pressure ratio, compressor efficiency cannot be compromised. There is, therefore, a need to increase efficiency at high tip clearance in small core axial configurations.

BRIEF DESCRIPTION

In one embodiment, a rotor blade of a gas turbine engine includes a pressure side, and a suction side opposite the pressure side and defining a rotor blade profile therebetween, the pressure side and the suction side each extending from a blade root to a blade tip. The rotor blade defines a cross-sectional median line midway between the pressure side and the suction side. The cross-sectional median line extends in a generally radial direction from the blade root to a lean point between the blade root and the blade tip. The cross-sectional median line extends off of radial from the lean point to the blade tip, defining a lean of the rotor blade between the lean point and the blade tip.

Additionally or alternatively, in this or other embodiments the lean point is located at between 80% of a rotor blade radial span and 95% of the rotor blade radial span, measured from the blade root.

Additionally or alternatively, in this or other embodiments the lean point is located at 90% of the rotor blade radial span, measured from the blade root.

Additionally or alternatively, in this or other embodiments the lean point is located at a radial position defined relative to the blade tip by a distance equal to between 100% and 300% of the tip clearance, defined as the distance between the blade tip and an outer air seal.

Additionally or alternatively, in this or other embodiments the cross-sectional median line extends off of radial toward the pressure side from the lean point to the blade tip.

Additionally or alternatively, in this or other embodiments the cross-sectional median line extends off radial by a magnitude equal to between 5% and 20% of the rotor blade radial span.

Additionally or alternatively, in this or other embodiments the cross-sectional medial line extends off radial by a magnitude equal to between 100% and 300% of the tip clearance, defined as the radial distance between the blade tip and an outer air seal.

Additionally or alternatively, in this or other embodiments the cross-sectional median line extends off radial in a linear direction.

Additionally or alternatively, in this or other embodiments the cross-sectional median line extends off radial in a curvilinear direction.

In another embodiment, a rotor of a gas turbine engine includes a rotor hub and a plurality of rotor blades extending from the hub at a blade root outwardly to a blade tip. Each rotor blade includes a pressure side, and a suction side opposite the pressure side and defining a rotor blade profile therebetween. The pressure side and the suction side each extend from the blade root to the blade tip. The rotor blade defines a cross-sectional median line midway between the pressure side and the suction side. The cross-sectional median line extends in a general radial direction from the blade root to a lean point between the blade root and the blade tip. The cross-sectional median line extending off of radial from the lean point to the blade tip, defining a lean of the rotor blade between the lean point and the blade tip.

Additionally or alternatively, in this or other embodiments the lean point is located at between 80% of a rotor blade radial span and 95% of the rotor blade radial span, measured from the blade root.

Additionally or alternatively, in this or other embodiments the lean point is located at 90% of the rotor blade radial span, measured from the blade root.

Additionally or alternatively, in this or other embodiments the lean point is located at a radial position defined relative to the blade tip by a distance equal to between 100% and 300% of the tip clearance, defined as the distance between the blade tip and an outer air seal.

Additionally or alternatively, in this or other embodiments the cross-sectional median line extends off of radial toward the pressure side from the lean point to the blade tip.

Additionally or alternatively, in this or other embodiments the cross-sectional median line extends off radial by a magnitude equal to between 5% and 20% of the rotor blade radial span.

Additionally or alternatively, in this or other embodiments the cross-sectional medial line extends off radial by a magnitude equal to between 100% and 300% of the tip clearance, defined as the radial distance between the blade tip and an outer air seal.

Additionally or alternatively, in this or other embodiments the cross-sectional median line extends off radial in a linear direction.

Additionally or alternatively, in this or other embodiments the cross-sectional median line extends off radial in a curvilinear direction.

Additionally or alternatively, in this or other embodiments the rotor is a high pressure compressor rotor of the gas turbine engine.

In yet another embodiment, a gas turbine engine includes a combustor and a compressor located upstream of the combustor to direct airflow to the combustor. The compressor including at least one rotor. The rotor includes a rotor hub and a plurality of rotor blades extending from the hub at a blade root outwardly to a blade tip. Each rotor blade includes a pressure side, and a suction side opposite the pressure side and defining a rotor blade profile therebetween. The pressure side and the suction side each extend from the blade root to the blade tip. The rotor blade defines a cross-sectional median line midway between the pressure side and the suction side. The cross-sectional median line extends radially from the blade root to a lean point between the blade root and the blade tip. The cross-sectional median line extends off of radial from the lean point to the blade tip, defining a lean of the rotor blade between the lean point and the blade tip.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
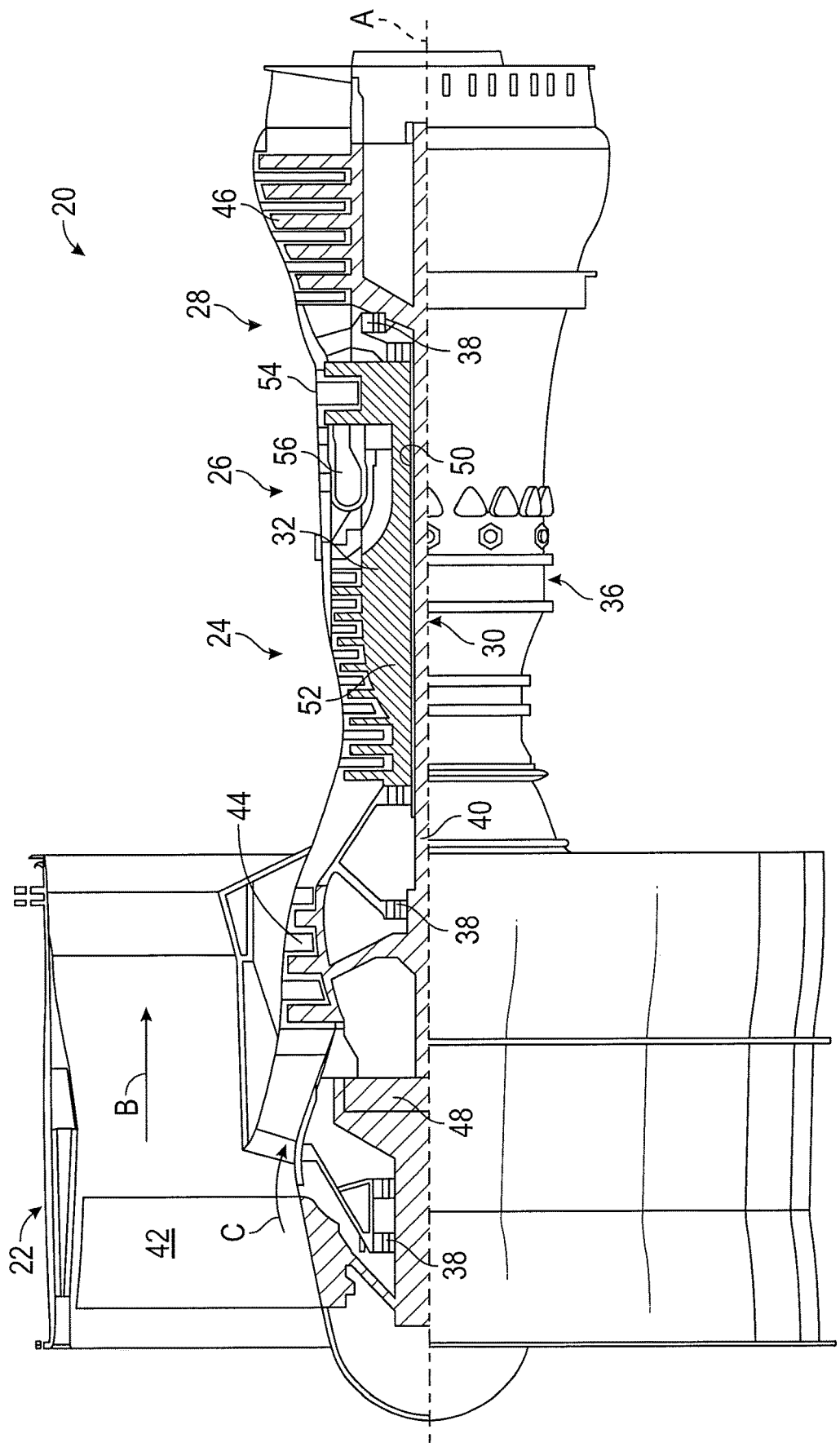
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFCC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 m/sec).

Figure 2:
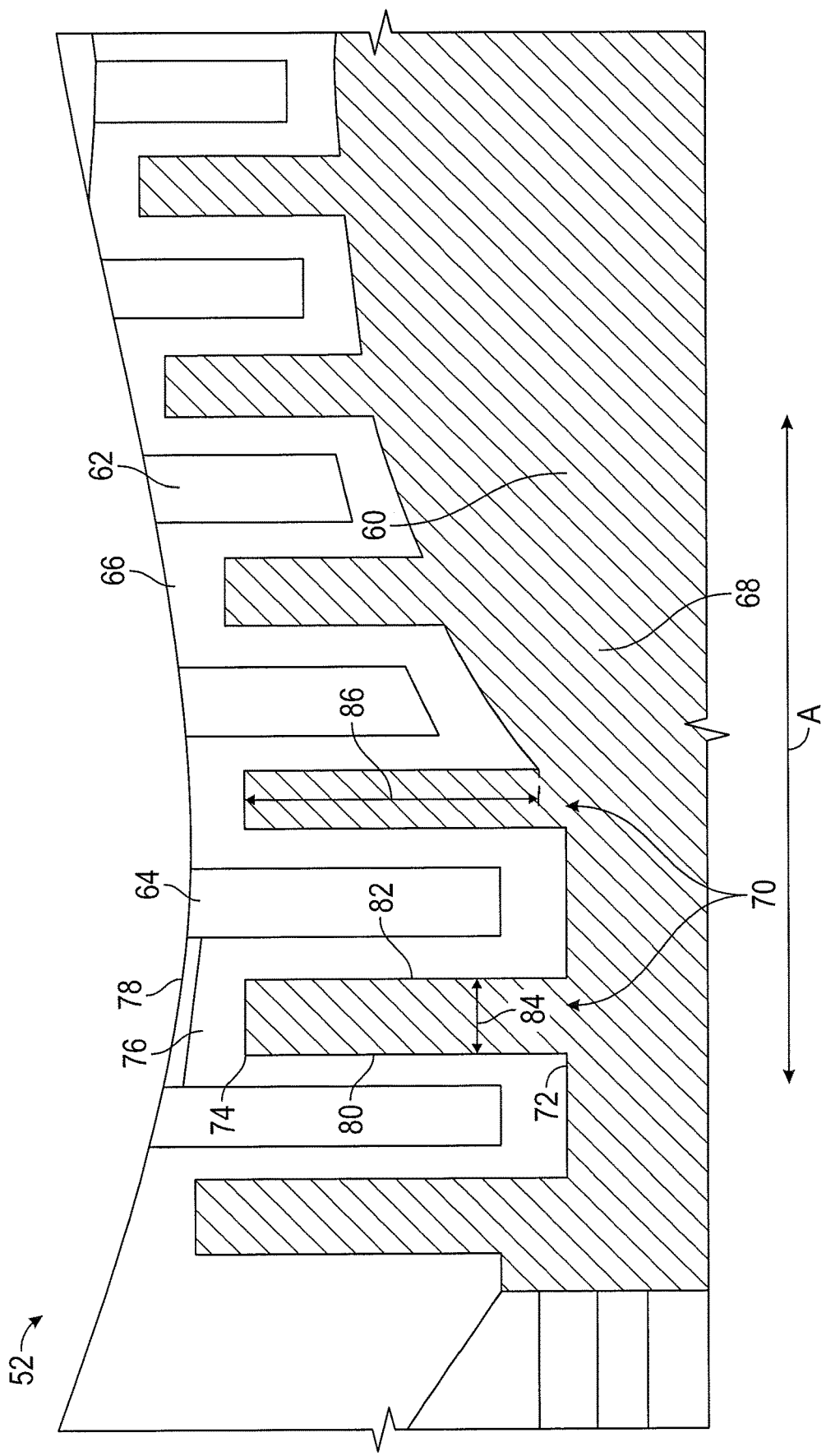
FIG. 2 is a partial cross-sectional view of a high pressure compressor section of a gas turbine engine.

Referring now to FIG. 2, illustrated is a cross-sectional view of an exemplary high pressure compressor 52. While the following is described in the context of a high pressure compressor 52, one skilled in the art will readily appreciate that the present disclosure may be readily applied to other sections of the gas turbine engine 10, such as the low pressure compressor 44.

The high pressure compressor 52 includes one or more rotors 60 and one or more stators 62 arranged in alternating rows or stages along the engine central longitudinal axis A. The stators include a plurality of stator vanes 64 secured to a fixed structure of the high pressure compressor 52, such as a compressor case 66. The stator vanes 64 are circumferentially fixed, relative to the engine central longitudinal axis A. Each rotor 60 rotates about the engine central longitudinal axis A, and includes a rotor hub 68 from which a plurality of circumferentially spaced rotor blades 70 extend radially outwardly. Each rotor blade 70 extends from a blade root 72 at the rotor hub 68 to a blade tip 74 defining a radially outboard extent of the rotor blade 74. Radial location of the blade tip 74 defines a tip clearance 76 between the rotor blade 70 and a rotationally fixed blade outer airseal 78 located at the compressor case 66. Further, each rotor blade 70 includes a blade leading edge 80 at an axially upstream end of the rotor blade 70 and a blade trailing edge 82 at an axially downstream end of the rotor blade 70, relative to the general direction of airflow through the high pressure compressor 52, parallel to engine central longitudinal axis A. A blade chord 84 is the distance between the blade leading edge 80 and the blade trailing edge 82, and a blade span 86 is the distance between the blade root 72 and the blade tip 74.

Figure 3:
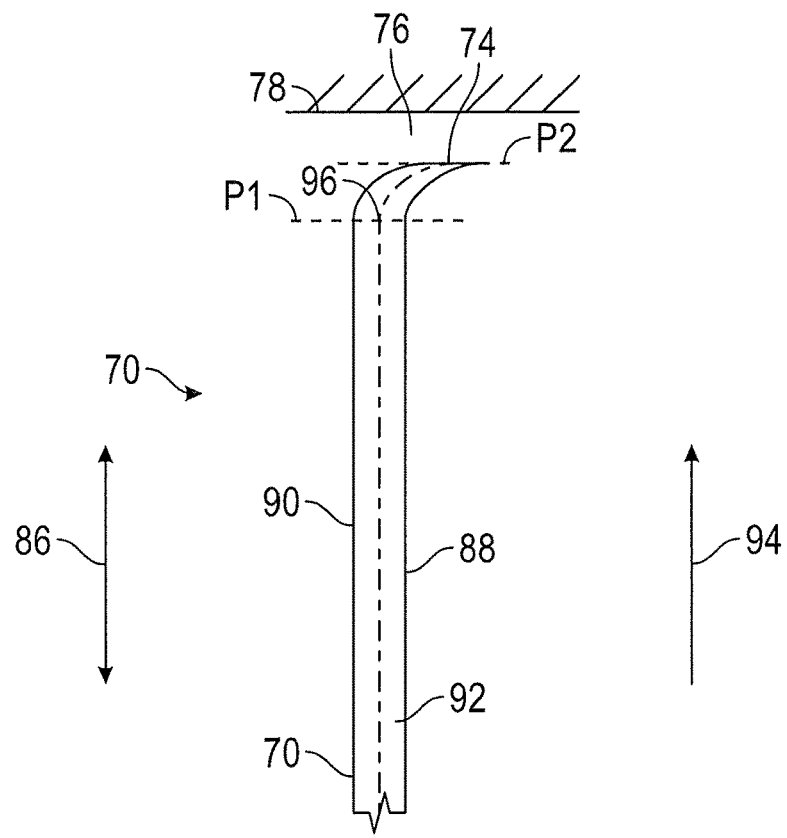
FIG. 3 is a cross-sectional view of an embodiment of a rotor blade of a rotor.

Referring now to FIG. 3, the rotor blade 70 includes a pressure side 88 and a suction side 90. During operation of the gas turbine engine 10, an air pressure at the pressure side 88 is greater than an air pressure at the suction side 90. In the cross-sectional view of FIG. 3, a cross-sectional median line 92 is defined midway between the pressure side 88 and the suction side 90, and extends from the blade root 72 to the blade tip 74. The median line 92 extends in the radial direction 94 from the blade root 72 to a lean point 96 located at a selected position along the blade span 86. From the lean point 86 to the blade tip 74, the median line 92 moves off of radial toward the pressure side 88, resulting in a lean of the rotor blade 70 between the lean point 96 and the blade tip 74. In some embodiments, the lean point 96 is located between 80% blade span and 95% blade span, measured from the blade root 72. In another embodiment, the lean point 96 is located at 90% blade span 86. In another embodiment, the lean point 96 is located at a distance from the blade tip 74 equal to between 100% and 300% of the tip clearance 76 defined between the blade tip 74 and the outer air seal 78.

Figure 4:
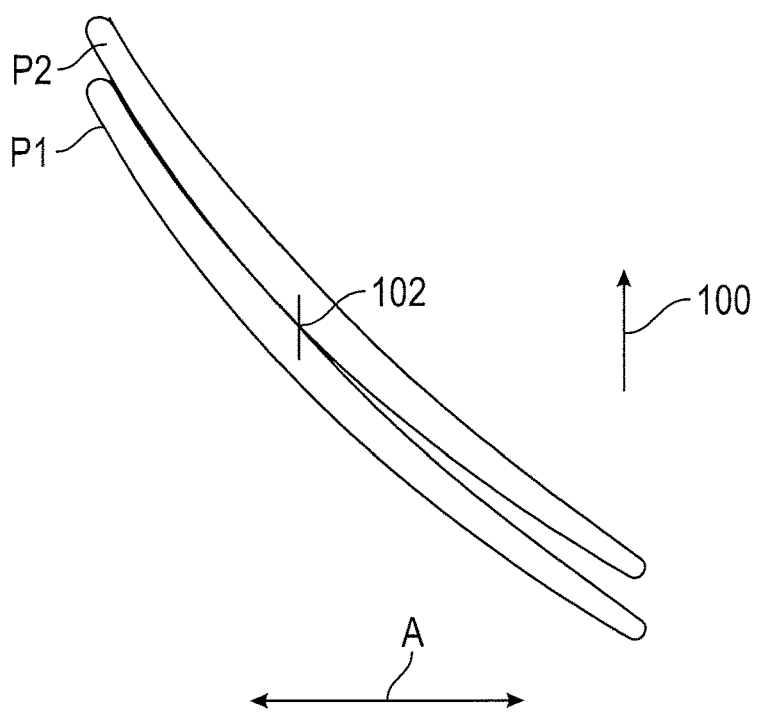
FIG. 4 is an overlay of cross-sectional profiles of a rotor blade of a gas turbine engine.

The lean of the rotor blade 70 is further illustrated in FIG. 4, which shows a rotor blade 70 profile at the lean point 96, indicated as "P1", with a rotor blade 70 profile at the blade tip 74, indicated as "P2". P2 is positioned offset from P1 in a circumferential direction 100 indicating the direction of lean, having a lean magnitude 102. In some embodiments, the lean magnitude 102 is related to the blade span 86, with in some embodiments the lean magnitude 102 being between 5% and 20% of the blade span 86. In another embodiment the lean magnitude 102 is related to the tip clearance 76 defined between the blade tip 96 and the outer air seal 78. In some embodiments the lean magnitude 102 being between 100% and 300% of the tip clearance 76. In some embodiments, the median line 92 extends linearly from the lean point 86 to the blade tip 74, defining a linear lean of the blade tip 74. In other embodiments, the median line 92 extends in a curvilinear direction from the lean point 86 to the blade tip 74, defining a curvilinear lean of the blade tip 74

The blade tip lean introduces a local obstruction at the blade tip 74 to the flow of air into the tip clearance 76 and therefore reduce the blockage and loss associated with the tip clearance vortex. The reduced blockage and loss associated with the blade tip lean increases the efficiency of the rotor and reduces the loss coefficient across the following stator, therefore improving the efficiency of the compressor stage. Because the tangential momentum in the tip region is reduced, the angle that the clearance vortex makes with the rotor blade 70 is reduced, as is the angle between the rotor blade 70 and the interface between the clearance flow and the incoming flow. This delays stall by moving the point at which the clearance interface impacts the circumferentially adjacent rotor blade 70.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor blade of a gas turbine engine, comprising:
   a pressure side; and
   a suction side opposite the pressure side and defining a rotor blade profile therebetween, the pressure side and the suction side each extending from a blade root to a blade tip;
   wherein the rotor blade defines a cross-sectional median line midway between the pressure side and the suction side, the cross-sectional median line extending in a generally radial direction from the blade root to a lean point between the blade root and the blade tip, the cross-sectional median line extending off of radial from the lean point to the blade tip, defining a lean of the rotor blade between the lean point and the blade tip; and
   wherein the lean point is disposed at a radial position defined relative to the blade tip by a distance equal to between 100% and 300% of a tip clearance, defined as the distance between the blade tip and an outer air seal.

2. The rotor blade of claim 1, wherein the lean point is disposed at between 80% of a rotor blade radial span and 95% of the rotor blade radial span, measured from the blade root.

3. The rotor blade of claim 2, wherein the lean point is disposed at 90% of the rotor blade radial span, measured from the blade root.

4. The rotor blade of claim 1, wherein the cross-sectional median line extends off of radial toward the pressure side from the lean point to the blade tip.

5. The rotor blade of claim 1, wherein the cross-sectional median line extends off radial by a magnitude equal to between 5% and 20% of the rotor blade radial span.

6. The rotor blade of claim 1, wherein the cross-sectional medial line extends off radial by a magnitude equal to between 100% and 300% of the tip clearance, defined as the radial distance between the blade tip and an outer air seal.

7. The rotor blade of claim 1, wherein the cross-sectional median line extends off radial in a curvilinear direction.

8. A rotor of a gas turbine engine, comprising:
a rotor hub; and
a plurality of rotor blades extending from the hub at a blade root outwardly to a blade tip, each rotor blade including:
a pressure side; and
a suction side opposite the pressure side and defining a rotor blade profile therebetween, the pressure side and the suction side each extending from the blade root to the blade tip;
wherein the rotor blade defines a cross-sectional median line midway between the pressure side and the suction side, the cross-sectional median line extending in a general radial direction from the blade root to a lean point between the blade root and the blade tip, the cross-sectional median line extending off of radial from the lean point to the blade tip, defining a lean of the rotor blade between the lean point and the blade tip; and
wherein the lean point is disposed at a radial position defined relative to the blade tip by a distance equal to between 100% and 300% of a tip clearance, defined as the distance between the blade tip and an outer air seal.

9. The rotor of claim 8, wherein the lean point is disposed at between 80% of a rotor blade radial span and 95% of the rotor blade radial span, measured from the blade root.

10. The rotor of claim 9, wherein the lean point is disposed at 90% of the rotor blade radial span, measured from the blade root.

11. The rotor of claim 8, wherein the cross-sectional median line extends off of radial toward the pressure side from the lean point to the blade tip.

12. The rotor of claim 8, wherein the cross-sectional median line extends off radial by a magnitude equal to between 5% and 20% of the rotor blade radial span.

13. The rotor of claim 8, wherein the cross-sectional medial line extends off radial by a magnitude equal to between 100% and 300% of the tip clearance, defined as the radial distance between the blade tip and an outer air seal.

14. The rotor of claim 8, wherein the cross-sectional median line extends off radial in a curvilinear direction.

15. The rotor of claim 8, wherein the rotor is a high pressure compressor rotor of the gas turbine engine.

16. A gas turbine engine, comprising:
a combustor; and
a compressor disposed upstream of the combustor to direct airflow to the combustor, the compressor including at least one rotor, the rotor including:
a rotor hub; and
a plurality of rotor blades extending from the hub at a blade root outwardly to a blade tip, each rotor blade including:
a pressure side; and
a suction side opposite the pressure side and defining a rotor blade profile therebetween, the pressure side and the suction side each extending from the blade root to the blade tip;
wherein the rotor blade defines a cross-sectional median line midway between the pressure side and the suction side, the cross-sectional median line extending radially from the blade root to a lean point between the blade root and the blade tip, the cross-sectional median line extending off of radial from the lean point to the blade tip, defining a lean of the rotor blade between the lean point and the blade tip; and
wherein the lean point is disposed at a radial position defined relative to the blade tip by a distance equal to between 100% and 300% of a tip clearance, defined as the distance between the blade tip and an outer air seal.

* * * * *